J. RYAN.
AUTOMOBILE SIGNAL.
APPLICATION FILED FEB. 23, 1917.
1,258,948.
Patented Mar. 12, 1918.
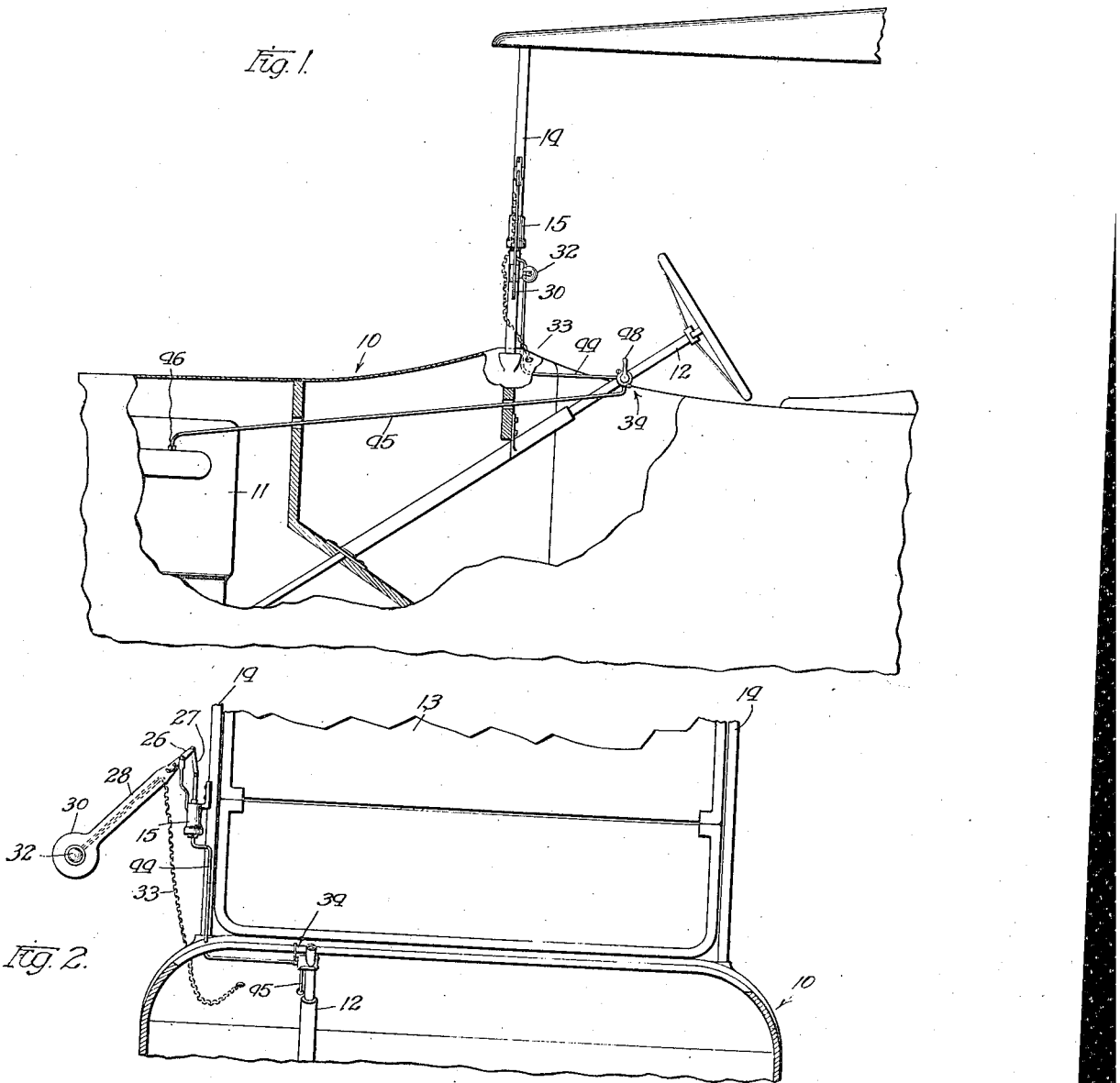

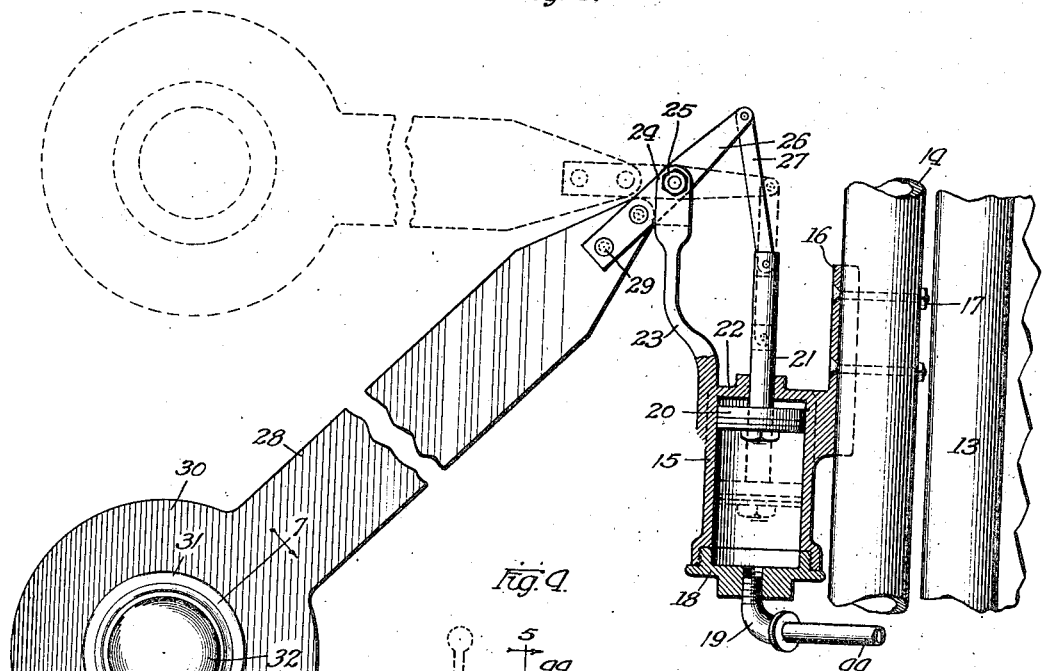
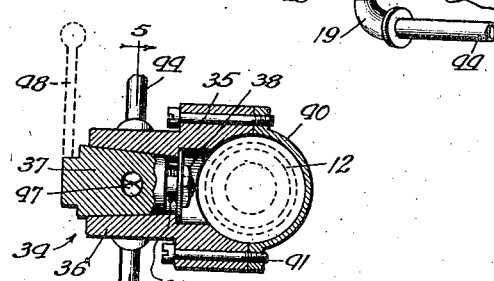
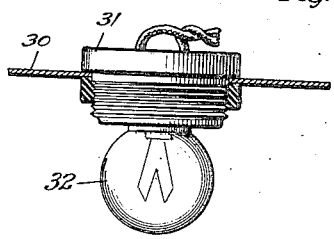
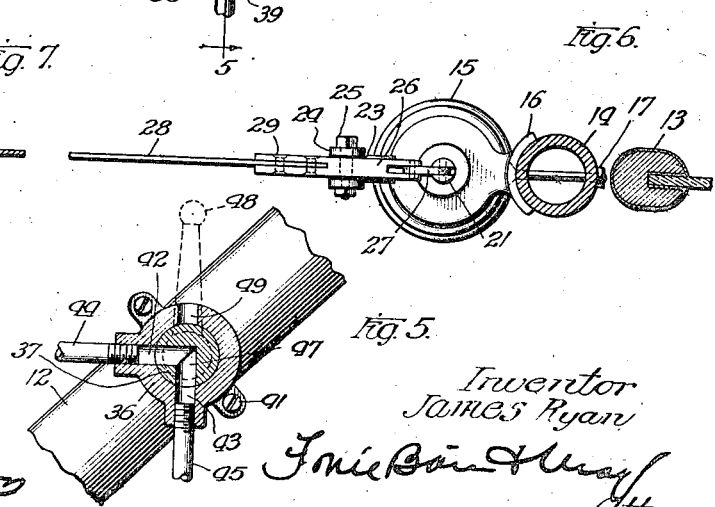

UNITED STATES PATENT OFFICE.

JAMES RYAN, OF INDIANAPOLIS, INDIANA.

AUTOMOBILE-SIGNAL.

1,258,948.  Specification of Letters Patent.  Patented Mar. 12, 1918.

Application filed February 23, 1917.  Serial No. 150,387.

*To all whom it may concern:*

Be it known that I, JAMES RYAN, a citizen of the United States, residing at Indianapolis, in the county of Marion and State of Indiana, have invented certain new and useful Improvements in Automobile-Signals, of which the following is a specification.

This invention relates to improvements in automobile signals and more particularly to a controllable signal for indicating that the vehicle is about to make a turn.

More particularly the invention relates to a semaphore type of signal arranged for convenient attachment to a car, preferably at the left side, and operated by means of a suction cylinder connected by a valved pipe with the intake manifold of the vehicle engine.

One of the objects of my invention is the provision of such a signal which may be readily controlled by the driver without manual effort and which will indicate to other drivers or pedestrians that the car is about to change its course.

Another object of my invention is the provision of such a signal which is simple in construction, easily attached to a vehicle, of sturdy, rugged construction, not liable to injury, and of low manufacturing cost.

Still other and further objects will become readily apparent to those skilled in the art from a consideration of the following description and drawings, wherein—

Figure 1 is a side elevation of a portion of an automobile, parts being broken away, illustrating the manner of attaching my improved signal.

Fig. 2 is a transverse sectional view through the driver's compartment of a car.

Fig. 3 is a side elevation of my improved signal illustrating its method of attachment, the suction cylinder being in section.

Fig. 4 is a transverse sectional view through the control valve.

Fig. 5 is a sectional view on the line 5—5 of Fig. 4.

Fig. 6 is a plan view of the signal, and;

Fig. 7 is a sectional view on the line 7—7 of Fig. 3.

In the drawings I have illustrated for the sake of clearly disclosing my invention, a preferred form of construction in which a bracket mounted on the left side of the wind shield carries a small suction cylinder, the piston of which is connected to a semaphore arm pivoted on the bracket.

The suction present in the intake manifold of the engine, whenever it is operating, is utilized to draw the piston downwardly and thus raise the semaphore arm into signaling position. A control valve for making or breaking connection between the suction cylinder and the intake manifold is mounted at any convenient point readily accessible to either the hand or the foot of the driver.

Referring now to the specific embodiment illustrated in the drawing the numeral 10 indicates in general a motor vehicle propelled by the internal combustion engine 11 and guided by means of the steering post 12. A wind shield 13 is positioned in front of the driver and is mounted on parallel vertical posts 14, the lower ends of which are rigidly mounted on the automobile body.

In the drawings I have shown my signal mechanism mounted on the left post of the wind shield with the arm so arranged that normally it will drop downwardly in an inconspicuous position, but on being actuated will be raised so that it projects outwardly at right angles from the wind shield post being readily visible either from the front or back of the car. It is preferable to mount the indicator upon the left hand side of the car since it is in turning to the left that it is more essential that a signal be given to cars either approaching from the front or the rear. In turning to the right a car is usually near the right hand side of the roadway and there is less danger of another car attempting to "cut-in" and cause a collision through failure of the driver on the following car to realize that the car ahead of him was about to make a turn.

The suction cylinder 15 is provided with an integral arm or bracket 16 arcuately formed in cross section for engagement with the wind shield supporting post 14 to which it may be secured by bolts 17. The lower end of the cylinder 15 is closed by the threaded cap 18 into which leads the pipe elbow 19 for making connection with the manifold of the engine. A piston 20 is reciprocable within the cylinder 15 and carries an upwardly extending piston rod 21 which projects guidedly through an opening in the piston head 22 formed integral with the cylinder. Extending outwardly from the opposite side of the cylinder casting from the bracket 16 is an upwardly extending arm 23 bifurcated at its upper end to provide forks 24 between which is pivotally mounted on the stud 25 the semaphore arm 26. The short inwardly extending end of the semaphore arm 26 is connected with the piston rod 21 by means of a link 27 and a flat metal arm 28 of a size sufficient to be readily visible is fastened, as at 29, to the outwardly extending end of the arm 26.

The semaphore blade 28 may be of any suitable size and shape, its length being sufficient to project beyond the side of the car and therefore be readily visible from the rear as well as from the front of the car. In the embodiment illustrated I have enlarged the end or head 30 of the blade 28 into a circular or disk shaped form and provided at its center a lamp socket 31 to receive the lamp bulb 32 which is connected by means of the wire 33 to the battery of the car. The light 32 serves to illuminate the semaphore at night and thus make the signal available at all times.

For the purpose of controlling the operation of the semaphore I have mounted upon the steering post 12 a control valve indicated in general by the numeral 34. This valve may take the form illustrated in detail in which a clamping bracket 35 is enlarged, as at 36, and tapered bored to receive the taper plug 37, resiliently held against its seat by means of nuts 38 and spring 39. A strap 40 passes around the opposite side of the steering post and is clamped to the bracket 35 by means of bolts 41. The tapered bored portion 36 of the valve is provided with ports 42, 43 into which are threaded the pipes 44, 45, the former leading to the suction cylinder and the latter extending into the intake manifold of the gas engine 11, as at 46. The taper plug 37 is provided with an L-shaped opening 47 adapted, when in the position illustrated in Fig. 5, to register with both ports 42, 43 and provide an open connection between the intake manifold and the suction cylinder. When in this position the suction of the engine will create a partial vacuum within the cylinder 15, drawing the piston 20 downwardly and thus raising the semaphore arm into the position indicated at dotted lines in Fig. 3. When the driver wishes to lower a signal he turns the control valve by means of the handle 48 a quarter revolution bringing one of the openings in the bore of the valve into register with port 42 and its other opening into register with the exhaust opening 49 which opens communication between the cylinder 15 and the atmosphere, thus breaking the vacuum and permitting the semaphore to drop by gravity into the position indicated in solid lines in Fig. 3.

Whereas I have illustrated and described a single embodiment of my invention it will be obvious that many changes or alterations may be made therein without departing from the spirit of the invention or the scope of the appended claims.

Having described my invention, what I claim is:—

1. The combination with a vehicle, of a motor for propelling the same, a semaphore arm pivotally mounted at one side of the vehicle, means operated by the motor for actuating the arm, and means controlled by the driver for operating the actuating means.

2. The combination with a vehicle, of a motor for propelling the same, a semaphore arm pivotally mounted at one side of the vehicle, and gravity maintained at inoperative position, means operated by the motor for raising the arm, and means controlled by the driver for operating the actuating means.

3. The combination with a vehicle, of a motor for propelling the same, a semaphore arm pivotally mounted at one side of the vehicle, a chamber having a movable wall, a connection between the movable wall and arm, a conduit connecting the chamber with the intake of the motor and a valve in said conduit.

4. The combination with a vehicle, of a motor for propelling the same, a semaphore arm pivotally mounted at one side of the vehicle, a cylinder, a piston therein, a connection between the piston and arm, a conduit connecting the cylinder at one side of the piston with the intake of the motor, and a valve in said conduit.

5. The combination with a vehicle, of a motor for propelling the same, and a direction indicating signal for the vehicle comprising a movable member, a piston and cylinder for moving said member, and a valved conduit connecting the cylinder with the intake of the motor.

6. The combination with a vehicle, of a motor for propelling the same, and a signal comprising a movable signal member mounted on the vehicle and a suction responsive motor operated by the suction of the engine for moving the signal member.

In testimony whereof I hereunto set my hand in the presence of two subscribing witnesses.

JAMES RYAN.

In the presence of—
 B. B. CLARKE,
 CATHERINE RYAN.